United States Patent [19]

Takashi

[11] Patent Number: 5,504,871
[45] Date of Patent: Apr. 2, 1996

[54] MEMORY CONTROLLER HAVING BUS MASTER FOR ADDRESSING INSTRUCTION MEMORIES

[75] Inventor: Mikio Takashi, Tokyo, Japan

[73] Assignee: Oki Electric Industry Co., Ltd., Tokyo, Japan

[21] Appl. No.: 100,264

[22] Filed: Aug. 2, 1993

[30] Foreign Application Priority Data

Aug. 5, 1992 [JP] Japan .................................. 4-209247

[51] Int. Cl.$^6$ .............................. G06F 9/26; G06F 9/32; G06F 12/06
[52] U.S. Cl. .................... 395/405; 395/421.03; 395/450; 395/375; 395/484; 364/DIG. 1; 364/243.3
[58] Field of Search ............................ 364/200 MS File, 364/900 MS File; 395/375, 425, 454, 484, 450, 452, 453, 421.03, 364, 401, 414

[56] References Cited

U.S. PATENT DOCUMENTS

| | | |
|---|---|---|
| 4,390,946 | 6/1983 | Lane ......................................... 395/375 |
| 4,521,851 | 6/1985 | Trubisky et al. ........................ 395/375 |
| 4,918,587 | 4/1990 | Pechter et al. .......................... 395/400 |
| 4,942,520 | 7/1990 | Langendorf ............................. 395/425 |
| 4,984,154 | 1/1991 | Hanatani et al. ....................... 395/375 |
| 5,148,538 | 9/1992 | Celtruda et al. ........................ 395/425 |
| 5,210,838 | 5/1993 | Jensen ..................................... 395/400 |
| 5,363,490 | 11/1994 | Alferness et al. ...................... 395/375 |
| 5,377,336 | 12/1994 | Eickemeyer et al. .................. 395/375 |
| 5,414,821 | 5/1995 | Nguyen et al. ......................... 395/375 |

FOREIGN PATENT DOCUMENTS 62-245351  10/1987  Japan .

*Primary Examiner*—Matthew M. Kim
*Attorney, Agent, or Firm*—Wenderoth, Lind & Ponack

[57] ABSTRACT

Instruction memories and a data memory are connected to a bus master which inputs or outputs an address signal and a data signal. The instruction memories are interleaved and are driven by a predicted address. The predicted address is retained upon accessing the data memory. As long as instruction codes are consecutive and addresses are not changed intentionally, effects of the interleaved arrangement can be shown even where a data area exists in the instruction codes.

5 Claims, 10 Drawing Sheets

FIG. 1(a)

MAIN INTERNAL MEMORY A

MAIN INTERNAL MEMORY B

| BANK 1 | BANK 2 | BANK 3 | BANK 4 |
|---|---|---|---|
| 0<br>4<br>{<br>m−4 | 1<br>5<br>{<br>m−3 | 2<br>6<br>{<br>m−2 | 3<br>7<br>{<br>m−1 |

FIG. 2

| INSTRUCTION MEMORY a | | INSTRUCTION MEMORY b | | DATA MEMORY D | |
|---|---|---|---|---|---|
| ADDRESS | CONTENTS | ADDRESS | CONTENTS | ADDRESS | CONTENTS |
| $m$ | $a_m$ | $m+1$ | $b_{m+1}$ | $n$ | $D_n$ |
| $m+2$ | $a_{m+2}$ | $m+3$ | $b_{m+3}$ | $n+1$ | $D_{n+1}$ |
| . | . | . | . | . | . |
| . | . | . | . | . | . |

FIG. 3

| ADDRESS | OUTPUT OF MEMORY a | OUTPUT OF MEMORY b | OUTPUT OF DATA MEMORY D | MEMORY OUTPUT |
|---|---|---|---|---|
| m | $a_m$ | | | $a_m$ |
| m+1 | | $b_{m+1}$ | | $b_{m+1}$ |
| m+2 | $a_{m+2}$ | | | $a_{m+2}$ |
| n | | | $D_n$ | $D_n$ |
| m+3 | | $b_{m+3}$ | | $b_{m+3}$ |
| m+4 | $a_{m+4}$ | | | $a_{m+4}$ |

MEMORY CONTROLLER HAVING BUS MASTER FOR ADDRESSING INSTRUCTION MEMORIES

BACKGROUND OF THE INVENTION

1) Field of the Invention

This invention relates to a memory controller for a computer.

2) Description of the Related Art

In the field of computer memory controllers, the following techniques are known inner alia for increasing the effective access speed to a main internal memory:

(1) To use the memory in the form of memory banks upon accessing the memory from a bus master, that is, to interleave memories so that the memories so interleaved can be used as sub-systems.

(2) In the interleaving referred to above, to use as an address to be outputted to one of the memory banks an expected address, which has been obtained by adding "1" to a preceding address of another memory bank, and then to output the predicted address from the preceding cycle.

The interleaving technique will now be described.

FIGS. 1(a) and 1(b) are diagrams showing the interleaved construction of main internal memories.

FIG. 1(a) diagrammatically illustrates the construction of one of the main internal memories, that is, the main internal memory A. Addresses are consecutively allocated to the main internal memory A, ranging from an address 0 to an address m−1. FIG. 1(b), on the other hand, diagrammatically depicts the construction of the other main internal memory, that is, the main internal memory B, which is divided into plural physical units (hereinafter called "banks"). In FIG. 1(b), the main internal memory B is divided by way of example into four banks ranging from a bank 1 to a bank 4. Address 0, address 4, . . . , and address m−4 are allocated to the bank 1, address 1, address 5, . . . , and address m−3 to the bank 2, address 2, address 6, . . . , and address m−2 to the bank 3, and address 3, address 7, . . . , and address m−1 to the bank 4. If the total capacity of the main internal memories A,B is assumed to be m, m is a multiple of 4.

To drive the main internal memory B by a CPU, a desired bank is designated by the least significant two bits of 16-bit address information from the CPU and a desired address in the bank is designated by the most significant 14 bits. Simultaneous feeding of these 14-bit addresses to address registers of the respective banks makes it possible to operate all the banks in parallel. The contents of consecutive addresses can therefore be accessed in a single memory cycle time, whereby a 4-fold speed can be obtained.

A program generally contains more consecutively executed instructions than branch instructions. Interleaving becomes effective when such consecutive areas are accessed.

FIG. 2 is an address state diagram, whereas FIG. 3 is a memory access state diagram. In the address state shown in FIG. 2, two kinds of information, one being instructions and the other data, are used as information to be stored in the memory and the information on the instructions is stored by interleaving. In an instruction memory a, contents $a_m$ are stored at an address m and contents $a_{m+2}$ are then stored at an address m+2. In an instruction memory b, contents $a_{m+1}$ are stored at an address m+1 and contents $a_{m+3}$ are then stored at an address m+3. In a data memory D, on the other hand, contents $D_n$ are stored at an address n and contents $D_{n+1}$ are then stored at an address n+1.

In the memory described above, interleaving is performed using the instruction memory a and the instruction memory b. Effects of interleaving are exhibited where data are not accessed and instructions are consecutively accessed.

Now assume that, in FIG. 3, the addresses m to m+4 are those to be used to access instructions while the address n is an address to be used upon accessing data. The instructions corresponding to the addresses m to m+4 are stored in an interleaved fashion in the memory a or memory b, while the data corresponding to the address n are stored in the data memory D.

Where the addresses for accessing the instructions consecutively continue from m to m+2, the address in for accessing the data occurs next, and addresses for accessing instructions again begin from m+3, the address n is located between the address m+2 and the address m+3 so that the continuity of the addresses for accessing the instructions is interrupted and the effects of interleaving are therefore impaired.

FIG. 4 is a time chart illustrating the interleaving.

In the case of a microprocessor in which signal lines are commonly used as address signal lines for instructions and also as address signal lines for data, the above-described construction and operation result in the existence of the data accessing cycle between the instruction accessing cycles as shown in FIG. 4. As a consequence, the continuity of address signals is prevented, leading to the problem that the effects of interleaving are significantly impaired.

SUMMARY OF THE INVENTION

An object of the present invention is to provide a memory controller which, even when one or more data accessing addresses are present in instruction accessing addresses, retains the continuity of address signals to show the effects of interleaving.

In one aspect of the present invention, there is thus provided a memory controller comprising:

(a) a bus master for inputting or outputting an address signal and a data signal;

(b) plural instruction memories with instruction codes fixing least significant bits of addresses by different values, respectively;

(c) a data memory having a data area;

(d) means for selecting the instruction codes and the data area on the basis of the address signal from the bus master; and (e) a memory control unit for selecting the instruction memory on the basis of the address signal from the bus master and the selecting means, whereby a read access is performed by a predicted address in the next cycle;

wherein the instruction memory retains the predicted address upon accessing the data memory.

BRIEF DESCRIPTION OF THE DRAWINGS

The above and other objects, features and advantages of the present invention will become apparent from the following description and the appended claims, taken in conjunction with the accompanying drawings, in which:

FIGS. 1(a) and 1(b) are diagrams showing the interleaved construction of main internal memories;

FIG. 2 is an address state diagram;

FIG. 3 is a memory access state diagram;

DETAILED DESCRIPTION OF PREFERRED EMBODIMENT

One embodiment of the present invention will hereinafter be described in detail with reference to the accompanying drawings.

Figure 4:
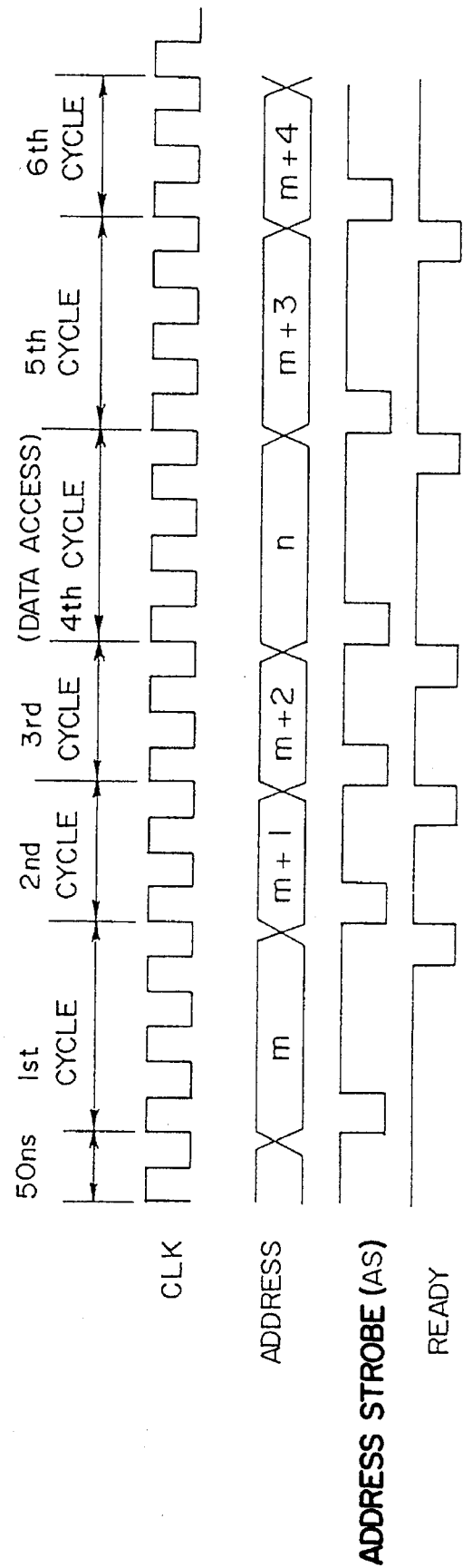
FIG. 4 is a time chart illustrating the interleaving.
Figure 5:
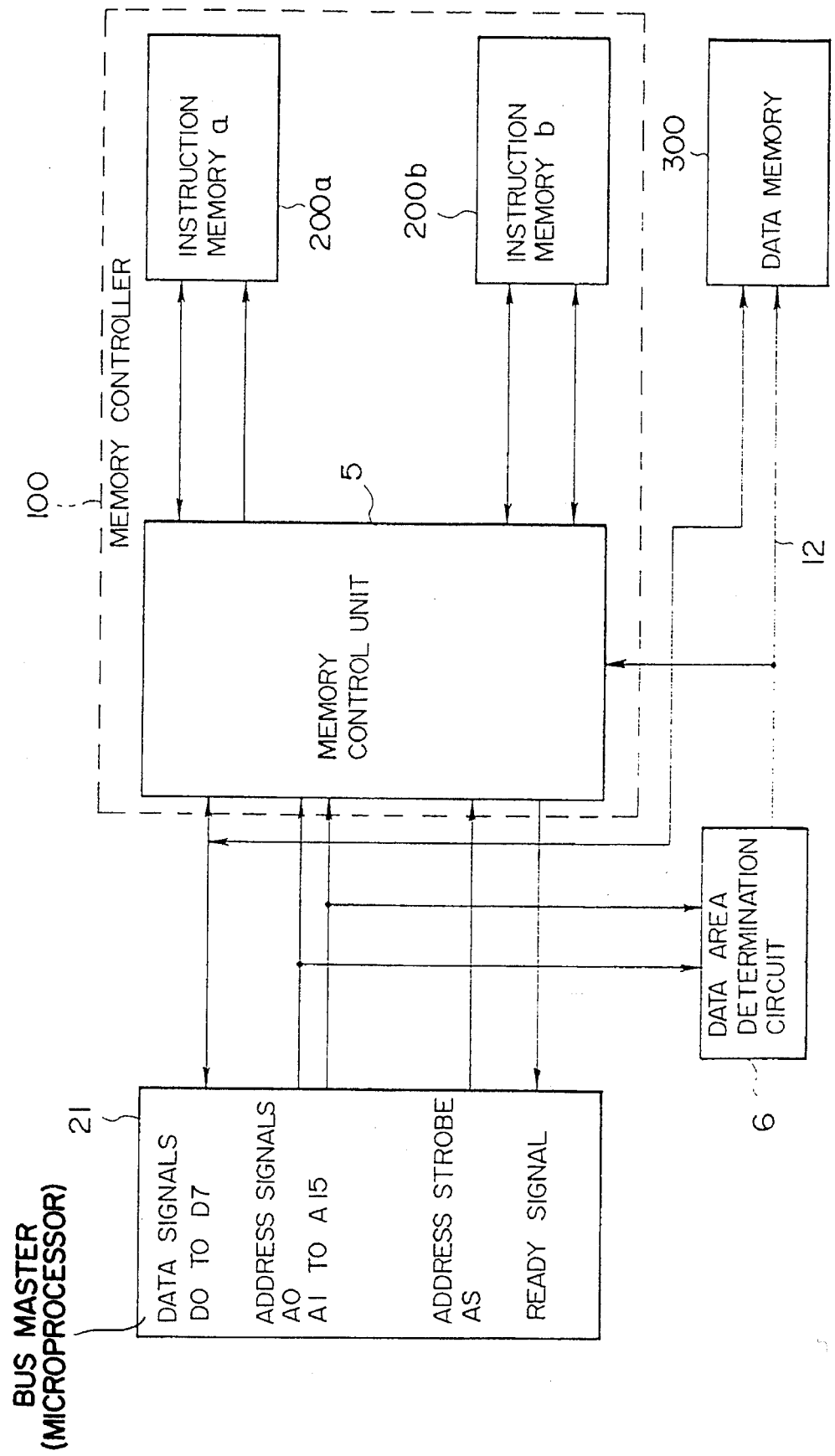
FIG. 5 is a diagram showing the construction of a memory controller according to one embodiment of the present invention.
Figure 6:
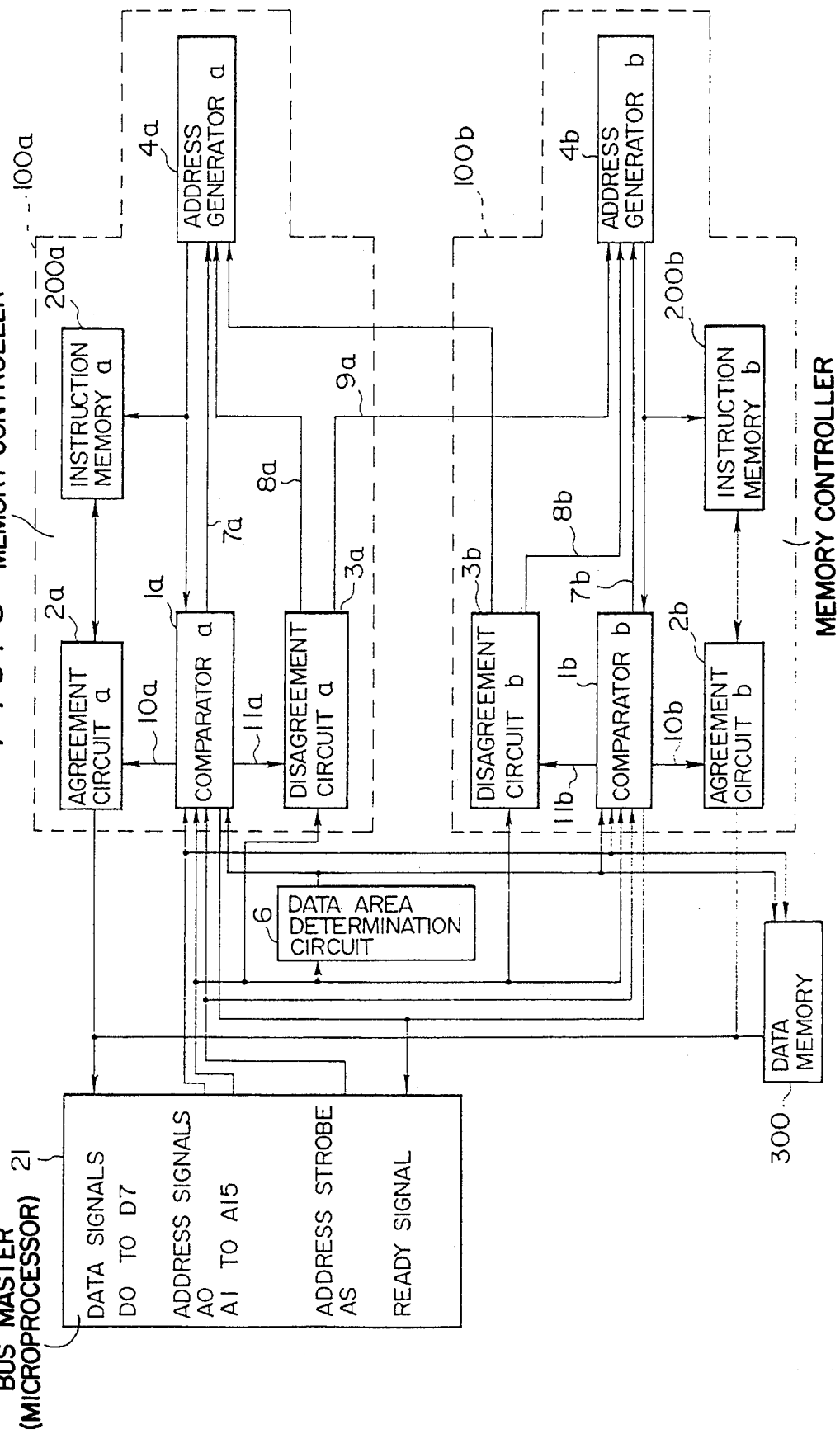
FIG. 6 is a block diagram of the memory controller according to the present invention.

Referring first to FIGS. 5 and 6, there are illustrated comparators 1a,1b, agreement circuits 2a,2b, disagreement circuits 3a,3b, address generators 4a,4b, a memory control unit 5, a data area determination circuit 6, a microprocessor (or bus master) 21, memory controllers 100, 100a,100b, instruction memories 200a,200b, and a data memory 300. Further, symbols 7a to 11a indicate signal lines from the respective devices.

The memory controller according to the present invention will now be described taking memory reading as an example.

In FIG. 5, the memory controller according to this invention is constructed of the memory controller 100, the data memory 300, the data area determination circuit 6 and the microprocessor 21. The memory controller 100 includes the instruction memories 200a, 200b, whose least significant bits are different from each other, and the memory control unit 5.

The microprocessor 21 outputs address signals to the memory controller 100, whereby instructions stored in the instruction memories 200a and instruction memories 200b are read and data signals are also read from the data memory 300.

The memory controller 100 is internally provided with the memory control unit 5, the instruction memory 200a and the instruction memory 200b. Interleaving is constructed by the instruction memory 200a and the instruction memory 200b. The illustrated embodiment of this invention will be described based on the interleaved construction divided into the two banks.

Further, address signals A0 to A15 and an address strobe AS are also inputted from the microprocessor 21 to the memory controller 100. From the memory controller 100 to the microprocessor 21, data signals D0 to D7 and a ready signal are inputted.

In the construction described above, when the data area determination circuit 6 determines that the address signals A0 to A15 from the microprocessor 21 relate to an instruction area rather than a data area, the memory controller 5 then selects either the instruction memory 200a or the instruction memory 200b on the basis of the address signals A0 to A15, so that it is determined from which instruction memory data are to be read. The memory controller 5 then designates addresses so that the data signals D0 to D7 are outputted to the microprocessor 21.

The data memory 300, on the other hand, determines by the data area determination circuit 6 whether the address signals A0 to A15 relate to data on the instruction memory or to data on the data memory. Where the address signals A0 to A15 relate to the data on the data memory, the data are outputted as the data signals D0 to D7. Otherwise, the data memory 300 outputs nothing.

The memory controller according to the present invention will be described in further detail with reference to the block diagram of FIG. 6.

The memory controller 100 is divided into the memory controller 100a and the memory controller 100b. The memory controller 100a controls the instruction memory 200a, while the memory controller 100b controls the instruction memory 200b.

Employed as a bus master connected to the memory controller 100a and the memory controller 100b is the microprocessor 21 of a 16-bit address width (A0 to A15) and an 8-bit data width (D0 to D7).

Signal delivered between the microprocessor 21 and the memory controller 100 include an address strobe AS, which is outputted to indicate the effectiveness of each address output, and a ready signal in addition to the above-described address signals (A0 to A15) and data-signals (D0–D7).

The ready signal serves to adjust the response time from the memory controllers 100a,100b to the corresponding instruction memories 200a,200b.

Further, signals delivered between the microprocessor 21 and the data memory 300 include the above-described address signals (A0 to A15) and data signals (D0 to D7). The address signals (A0 to A15) are inputted to the data memory 300 on the basis of a data access signal at signal line 12 issued by the data area determination circuit 6.

It is to be noted that signals other than those referred to above are omitted herein for the simplification of the description.

In FIG. 5, the area surrounded by broken lines constitutes the memory controllers 100a,100b which include the instruction memories 200a,200b, respectively. It is to be noted that, unless otherwise specifically indicated, the devices identified by each like reference numeral except for the addition of a or b in the drawing operate in exactly the same manner.

An address signal from the microprocessor 21 is divided into the least significant bit A0 and the most significant bits A1 to A15 are inputted together with the address strobe AS to the respective comparators 1a,1b and are also inputted to the data area determination circuit 6. Further, the ready signal for the microprocessor 21 is outputted from the comparator 1a or 1b.

Here, the comparators 1a and 1b are different in the following respects. The comparator 1a operates when the address A0 is "0", the address strobe AS is active "0" and an output from the data area determination circuit 6 is inactive "1", whereas the comparator 1b operates when the address A0 is "1", the address strobe AS is active "0" and the output from the data area determination circuit 6 is inactive "1". In other words, access of instruction memory at even-numbered addresses leads to operation of the controller 100a so that the instruction memory 200a is accessed. Access of instruction memory at odd-numbered addresses, on the other hand, results in operation of the controller 100b so that the instruction memory 200b is accessed.

As the instruction memory is divided into two, that is, the instruction memory 200a and the instruction memory 200b by the interleaving, the least significant bit A0 of each address of the instruction memory 200a is always "0" and the least significant bit A0 of each address of the instruction memory 200b is always "1". It is therefore possible to distinguish the instruction memory 200a and the instruction memory 200b on the basis of the value of the least significant bit A0.

Memory-reading access operation by the circuit construction of FIG. 6 will next be described with reference to FIG. 7 through FIG. 11.

Figure 9:
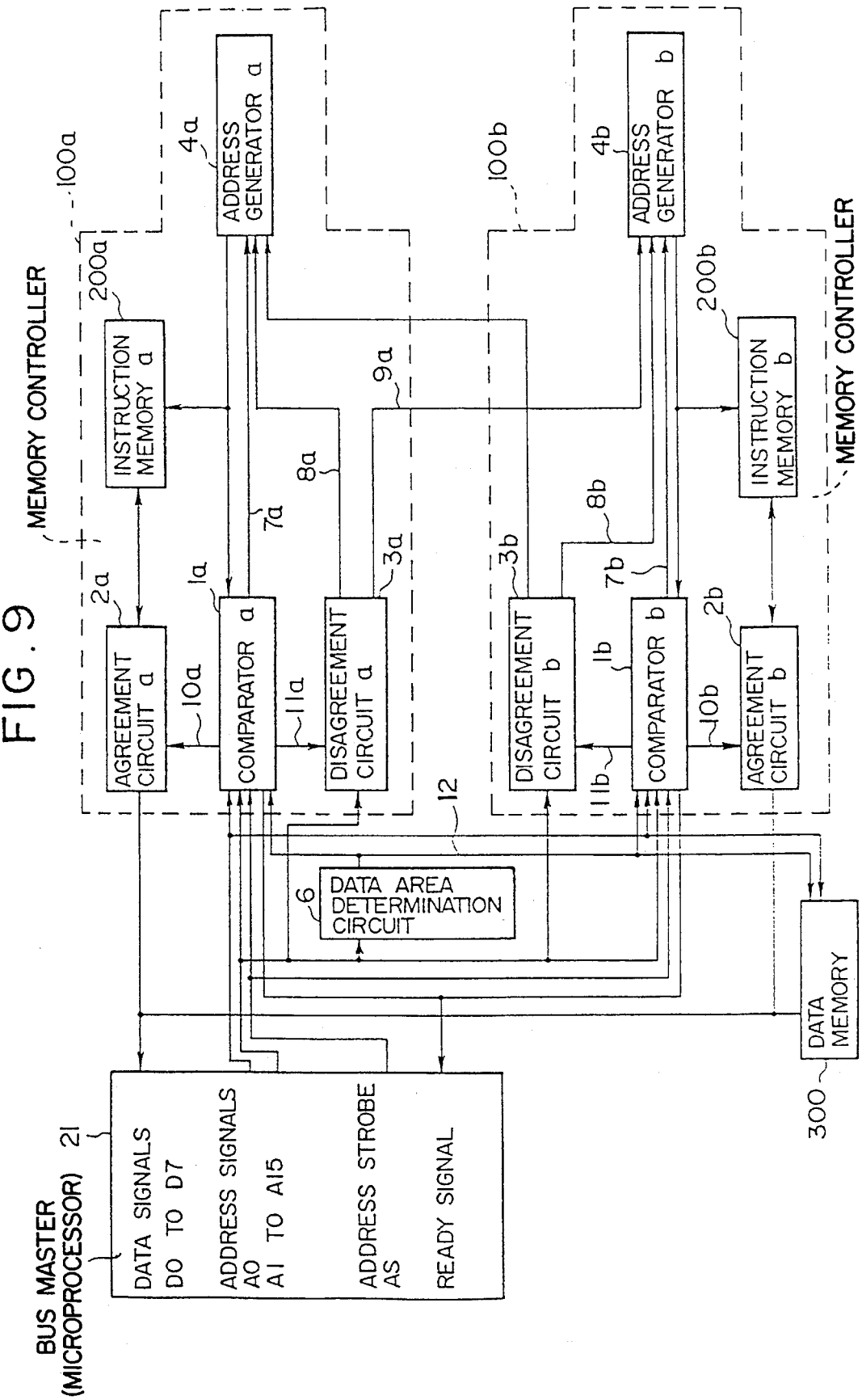
FIG. 9 is a further flow chart of signals in the memory controller of FIGS. 5 and 6.
Figure 10:
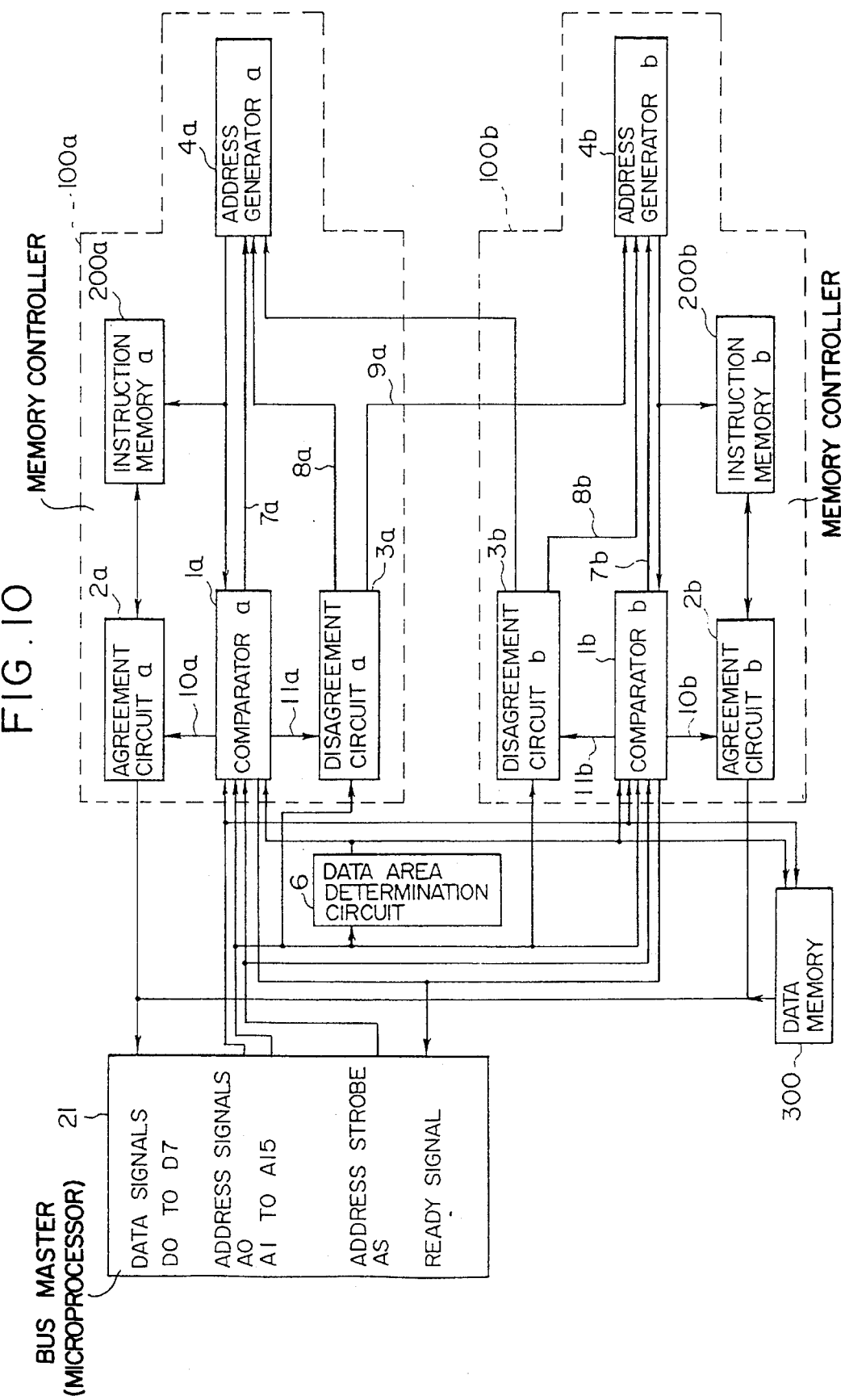
FIG. 10 is a still further flow chart of signals in the memory controller of FIGS. 5 and 6.
Figure 11:
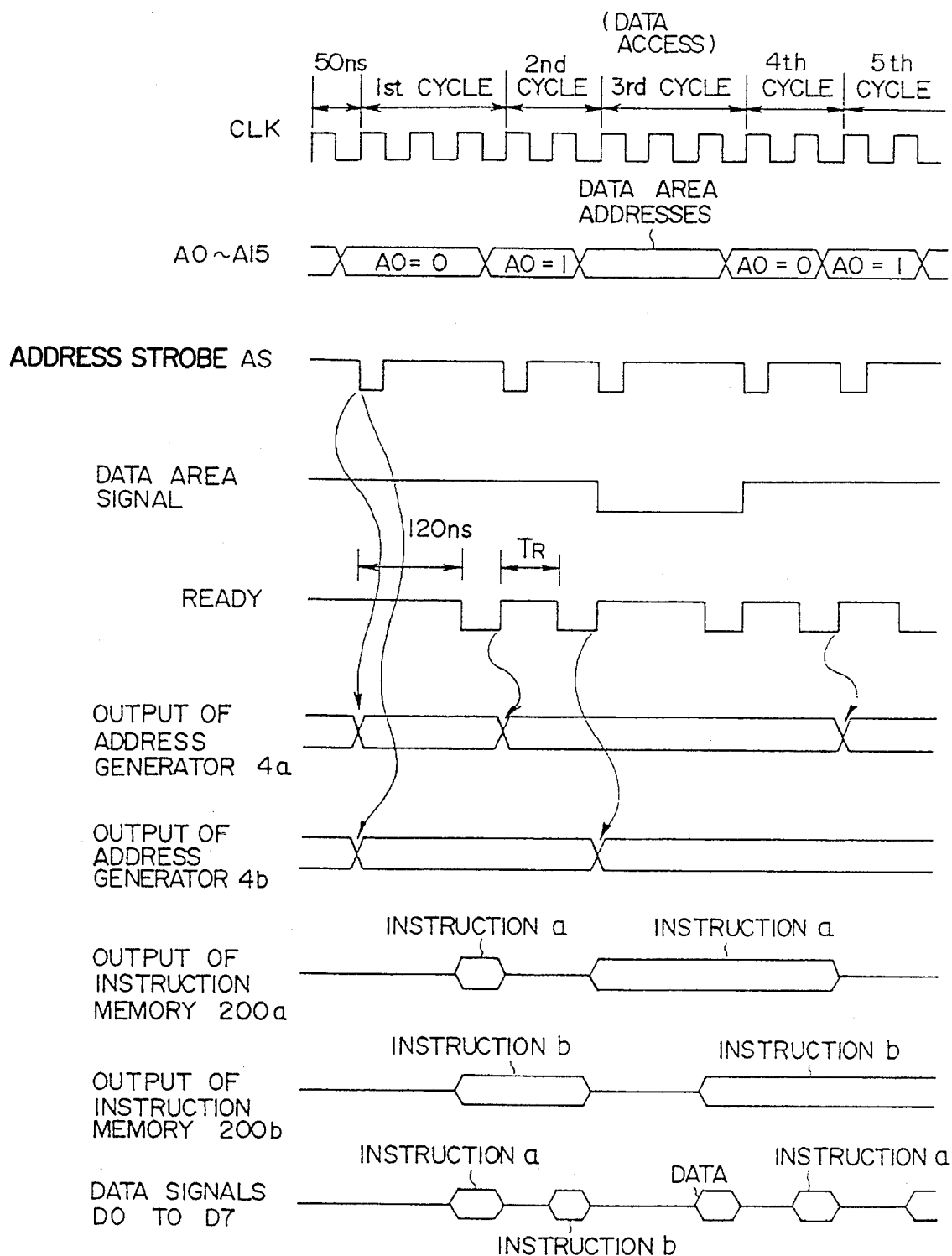
FIG. 11 is a time chart of the memory controller of FIGS. 5 and 6.

FIG. 7 through FIG. 10 are charts of signals upon reading the memories of the memory controller according to this invention, whereas FIG. 11 is a time chart for reading the memories of the memory controller of this invention.

The memory-reading access operation by the circuit construction of FIG. 6 will next be described with reference to FIG. 7.

Here assume that the clock (CLK) cycle is 50 nS and the access time to the instruction memories, namely, the response time is 120 n/s.

A description will hereinafter be made in the order of the 1st cycle to the 5th cycle shown in FIG. 11.

1st cycle

First, the 1st cycle in the time chart of FIG. 11 will be described.

Figure 7:
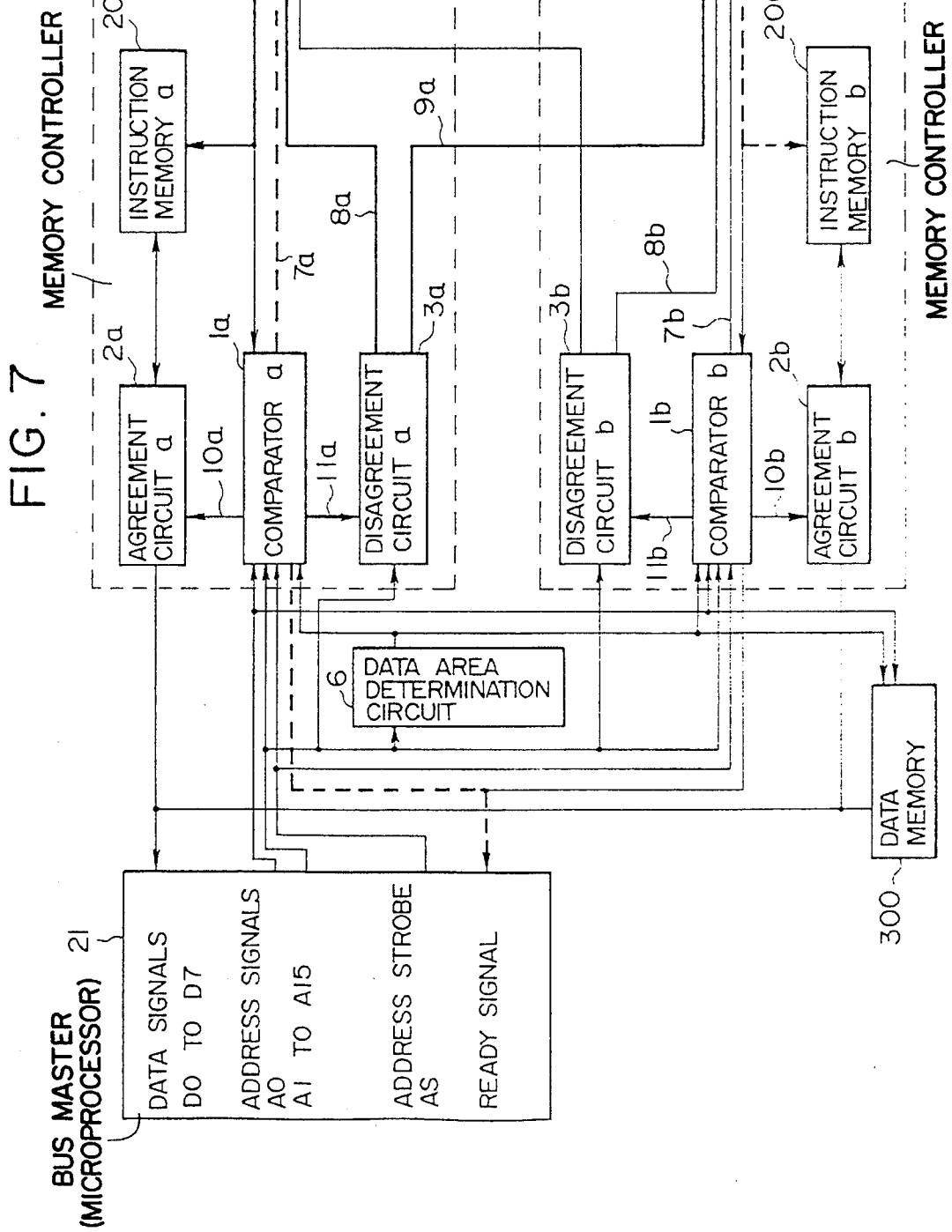
FIG. 7 is a flow chart of signals in the memory controller of FIGS. 5 and 6.

FIG. 7 shows flows of memory-reading signals in the 1st cycle.

When an access to the instruction memories by the microprocessor 21 in the 1st cycle is initiated, real addresses A0 to A15 are inputted from the microprocessor 21 to the comparators 1a,1b and the data area determination circuit 6 and the address strobe AS becomes active.

When the address signals are intended to access the instruction memory, the data area determination circuit 6 then determines that these address signals are to be used to access the instruction memory. The data area determination circuit 6 therefore outputs a signal to drive the comparator 1a or the comparator 1b.

Where the least significant bit A0 of the address is "0" the comparator 1a is operated.

In the 1st cycle, the real address inputted as described above is an initial value and no preceding address value to be compared with the real address exists. The comparator 1a therefore outputs a disagreement signal at signal line 11a to the disagreement circuit 3a.

The disagreement circuit 3a, which has received the disagreement signal at signal line 11a, then outputs an address output setting signal at signal line 8a of the most significant bits A1 to A15 to the address generator 4a and, at the same time, address output setting signal at signal line 9b of the most significant bits A1 to A15 to the address generator 4b on the side of the other memory controller 100b. Responsive to the input of the address output setting signal at signal line 8a, the address generator 4a outputs the real addresses A1 to A15 to the instruction memory 200a. The signals up to this stage are indicated by solid lines in FIG. 7, while subsequent signals will be indicated by solid broken lines.

Since the comparator 1a has outputted the disagreement signal at signal line 11a, the memory cycle outputs the ready signal to the microprocessor 21 upon elapsed time of the access time inherently required by the instruction memory 200a, namely, 120 nS or longer. At the same time, the comparator 1a also outputs values which have been obtained by adding "2" to the addresses —that is, values—which have been obtained by adding "1" to the addresses A1 to A15—as address setting signals at signal line 7a to the address generator 4a.

As a result, the address generator 4a expects addresses required for the instruction memory 200a, said addresses to be accessed in the 3rd cycle, and outputs them to the instruction memory 200a from the 2nd cycle.

Concurrently with the operation described above, the other address generator 4b to which the address output setting signals of the most significant bits A1 to A15 have been inputted outputs the address output setting signals at signal line 9a as they are, that is, as addresses, which are to be required for the instruction memory 200b in the 2nd cycle, to the instruction memory 200b.

2nd cycle

Next, the 2nd cycle in the time chart of FIG. 11 will be described.

Figure 8:
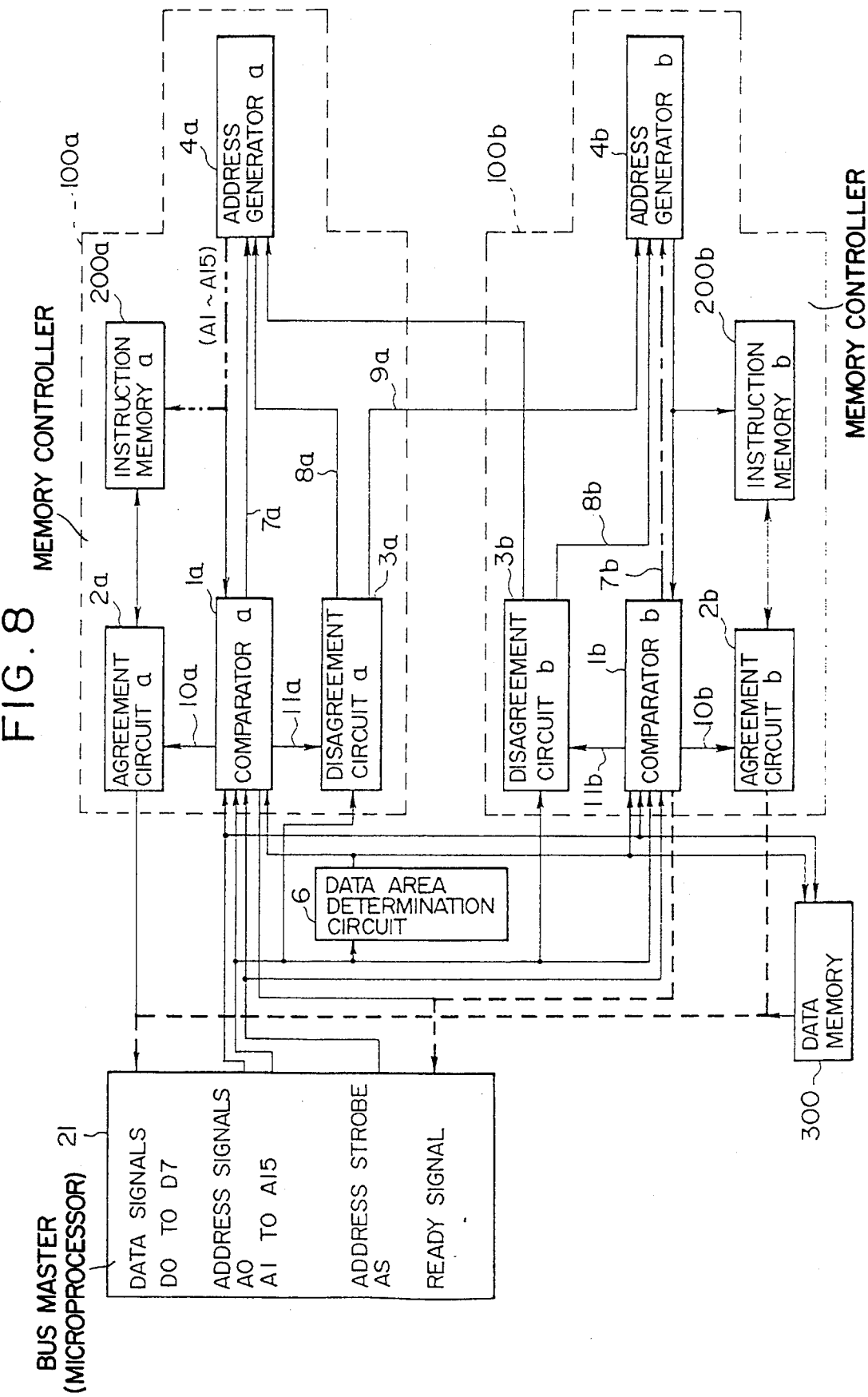
FIG. 8 is another flow chart of signals in the memory controller of FIGS. 5 and 6.

FIG. 8 shows memory-reading signals in the 2nd cycle.

When an access to each instruction memory in the 2nd cycle is initiated by the microprocessor 21, the real addresses A0 to A15 are inputted from the microprocessor 21 to the comparators 1a,1b and the data area determination circuit 6 and the address strobe AS becomes active.

When the address signals are intended to access the instruction memory, the data area determination circuit 6 then determines that these address signals are to be used to access the instruction memory. The data area determination circuit 6 therefore outputs a signal to drive the comparator 1a or the comparator 1b.

Where the least significant bit A0 of the address is "1", the comparator 1b is operated.

Values, which have been obtained by adding "1" to the addresses A0 to A15 set at the address generator 4a by the address setting signals at signal line 7a in the 1st cycle, are outputted to the memory 200a, whereby addresses to be accessed in the 3rd cycle are predicted and set in advance. These signals are indicated by a solid two-dot chain line in FIG. 8.

When the 2nd cycle is entered, the microprocessor 21 outputs addresses to the comparators, which addresses are after those outputted in the 1st cycle. In general, the addresses next to those generated in the 1st cycle, namely, values obtained by adding "1" to the addresses in the 1st address are outputted.

Since the least significant bit was "0" in the 1st cycle, the addition of "1" to the least significant bit does not alter the most significant bits A1 to A15 but changes only the least significant bit A0 from "0" to "1".

Because the address generator 4b takes the addresses A1 to A15 as predicted addresses owing to the address output setting signals at signal line 9a in the 1st cycle, the predicted addresses agree with the real addresses. As A0 is now "1" in the 2nd cycle, the comparator 1a does not operate but the comparator 1b operates.

The comparator 1b compares the real addresses A1 to A15 with the predicted addresses A1 to A15 so that an agreement signal at signal line 10b indicating an agreement therebetween is outputted to the agreement circuit 2b. At the instruction memory 200b, the state of setting by the predicted addresses is retained as is.

As has been described above, the instruction memory 200b has been in a state already subjected to address setting by the expected addresses before the real addresses are inputted. After entrance to the 2nd cycle, it is therefore possible to make the ready signal active in a short time $T_R$ so that the data of the corresponding address (A0="1") can be read. A flow of this signal is indicated by a solid broken line in FIG. 8.

Similarly to the 1st cycle described above, values obtained by adding "2" to the addresses in the 2nd cycle, namely, values obtained by adding "1" to the addresses A1 to A15 are outputted as address setting signals at signal line 7*b* from the comparator 1*b* to the address generator 3*b* as indicated by a solid alternate long and short dash line in FIG. 8. These address values are set in the memory 200*b* as expected addresses for the 4th cycle.

3rd cycle

Next, the 3rd cycle in the time chart of FIG. 11 will be described.

FIG. 9 shows flows of memory-reading signals in the 3rd cycle.

In the 3rd cycle, when addresses not in an instruction area but in a data area are outputted by the microprocessor 21, the data area determination circuit 6 makes active ("0") the signal data access signal at signal line 12 which indicates that this cycle is a cycle for the data memory 300, whereby the comparators 1*a*,1*b* are prevented from operation.

Data signals from the data memory 300 are outputted as data signals to the microprocessor 21 responsive to the ready signal from unillustrated control means provided in the memory controller 5.

Accordingly, during the access to the data memory 300, the predicted addresses set in the instruction memories 200*a*,200*b* are retained as are.

4th cycle

Next, the 4th cycle in the time chart of FIG. 11 will be described.

FIG. 10 shows flows of memory-reading signals in the 4th cycle.

In the 4th cycle, the comparator 1*a* operates when an instruction address (A0="0") next to the address in the 2nd cycle is outputted by the microprocessor 21.

In the comparator 1*a*, real addresses are compared with the above-described predicted addresses generated from the address generator 4*a* in the 2nd cycle. In the present embodiment of the this invention, the instruction addresses outputted form the microprocessor 21 from the 1st cycle to the 5th cycle except for the 3rd cycle in which the data area is accessed are assumed to be consecutive, the real addresses and the expected addresses are in agreement.

Accordingly, the state of setting by the predicted addresses in the instruction memory 200*a* are retained as are. This also makes it possible to return the ready signal to the microprocessor 21 in a short time TR in the 4th cycle so that the instruction data at the corresponding addresses can be read.

As long as real instruction addresses outputted from the microprocessor 21 in the subsequent cycles, that is, in the 5th cycle, the 6th cycle and so on are consecutive, instruction data can be read in a short time without affecting the interleaved construction even if an access to data exists in the accesses to instructions.

The present invention is not limited to the embodiments described above and can be changed or modified in various ways on the basis of the spirit of the present invention. Such changes or modifications should not be excluded from the scope of the present invention.

I claim:

1. A memory controller comprising:
   (a) a bus master for outputting an address signal and receiving a data signal in each of successive operational cycles;
   (b) plural instruction memories for storing instruction codes and respectively designated by different fixed addresses;
   (c) a data memory for storing data contents;
   (d) means for determining whether the address signal in each operational cycle is for addressing said plural instruction memories or said data memory, wherein said data memory is accessed according to said address signal and addressed data contents thereof are outputted as said data signal when said determining means determines that said address signal is for addressing said data memory; and
   (e) a memory control unit for accessing one of said plural instruction memories according to at least one least significant bit of said address signal and outputting an addressed instruction code thereof as said data signal when said determining means determines that said address signal is for addressing said plural instruction memories, and for determining a predicted address of a next operational cycle based on an address of said addressed instruction code, wherein a one of said plural instruction memories retains said predicted address when said data memory is accessed in the next operational cycle.

2. The memory controller in claim 1, wherein the memory control unit controls an access timing of said plural instruction memories according to a comparison between an address of said address signal from the bus master and said predicted address.

3. The memory controller in claim 1, wherein said memory control unit determines said predicted address by adding a value which corresponds to a number of said plural instruction memories to the value of an address contained in said address signal.

4. The memory controller of claim 1, wherein said memory control unit selects one of said plural instruction memories on the basis of an address contained in said address signal from said bus master.

5. The memory controller of claim 4, wherein said memory control unit controls an access timing of said plural instruction memories according to a comparison between said address contained in said address signal from said bus master and said predicted address.

* * * * *